United States Patent [19]
Fujita et al.

[11] Patent Number: 5,145,277
[45] Date of Patent: Sep. 8, 1992

[54] FASTENING A WHEEL OR WHEEL-LIKE BODY TO A SHAFT

[75] Inventors: Norihisa Fujita, Takatsuki; Hiroaki Nagasawa, Nagaokakyo; Shinsuke Sahara, Takatsuki, all of Japan

[73] Assignee: Tsubakimoto Chain Co., Osaka, Japan

[21] Appl. No.: 707,349

[22] Filed: May 30, 1991

[30] Foreign Application Priority Data

Jul. 2, 1990 [JP] Japan .................. 2-69583[U]

[51] Int. Cl.⁵ .................................... F16B 2/14
[52] U.S. Cl. ................... 403/374; 403/370; 403/371; 301/111
[58] Field of Search .......... 301/1, 9 R, 9 AH, 9 AN, 301/9 DN, 9 S, 105 R, 111, 114–117, 122, 126, 131; 403/370, 371, 374; 74/405, 406

[56] References Cited

U.S. PATENT DOCUMENTS 4,726,703  2/1988  Ashley ............................. 403/370
4,781,486 11/1988  Mochizuhi ..................... 403/370 X
5,039,245  8/1991  Hansen ............................ 403/270

*Primary Examiner*—Russell D. Stormer
*Attorney, Agent, or Firm*—Howson & Howson

[57] ABSTRACT

A fastener for securing a wheel to a shaft comprises a first ring having a cylindrical central opening. The first ring includes a radially extending portion having for engaging one side of the wheel. A boss having a tapered outer surface extends axially from the radially extending portion, and the central opening extends through the radially extending portion and through the boss. The fastener also includes a second ring for engaging the opposite side of the wheel, and a third ring having an inner surface engageable with the tapered outer surface of the boss of the first ring. Bolts connectable to the second and third rings urge the second and third rings axially toward each other whereby the second ring is urged against said opposite side of the wheel so that the wheel is axially pressed between the first and second rings, and the inner cylindrical surface of the boss is radially pressed against the shaft.

20 Claims, 2 Drawing Sheets

FASTENING A WHEEL OR WHEEL-LIKE BODY TO A SHAFT

BRIEF SUMMARY OF THE INVENTION

This invention relates to fastening devices and in particular to a novel device for fastening to a shaft a wheel, or a wheel-like body such as a gear, a sprocket, a coupling or the like.

In the prior art, a wheel or wheel-like body is typically secured to a shaft by means of a pair of rings both of which have portions which fit into a space between the shaft and the wall of a central hole in the wheel or wheel-like body. The portions of the rings have tapered surfaces which cooperate with each other to cause one of the rings to press inward on the shaft while the other ring presses outward on the wall of the central hole.

The wheel or wheel-like body may be provided with a boss in order to increase the axial length of the central hole. Since the rings are located within the central hole, the diameter of the hole is substantially larger than the diameter of the shaft. Consequently, the outside diameter of the boss becomes disadvantageously large. The conventional tapered ring fastener cannot be used with very small diameter wheels. The tapered rings also apply a high outward pressure to the inner surface of the hole within the boss, and can cause breakage if the material of the boss is weak.

The general object of the invention is to overcome the aforementioned disadvantages of prior fastening devices. One specific object of this invention is to provide a fastening device which eliminates the disadvantages of a large-diameter boss on the wheel or wheel-like body. Another object of the invention is to provide an improved fastening device which is capable of accommodating small-diameter wheels and wheel-like bodies. Still another object of the invention is to provide a fastening device which is less likely than conventional fastening devices to cause breakage. Other objects of the invention include the capability of transmitting a large torque, usability with wheels and wheel-like bodies having a relatively small tensile strength, and usability with wheels and wheel-like bodies having a relatively small compressive strength.

The fastener in accordance with the invention, comprises a first ring which serves as a shaft clamping ring. This first ring has means providing a substantially cylindrical central opening capable of receiving a shaft. The first ring includes a radially extending portion having means providing a first face on one side of the radially extending portion for engaging one side of a wheel or wheel-like body in a first axial direction. A boss extends axially from the other side of the radially extending portion of the first ring, and the central opening extends axially through the radially extending portion and through the boss. The boss has an outer surface tapered down in a direction opposite to said first axial direction. The fastener also includes means, preferably in the form of a second ring, providing a second face for engaging the opposite side of the wheel or wheel-like body in an axial direction opposite to said first axial direction, and a third ring, serving as a pressing ring, having an inner surface engageable with the tapered outer surface of the boss of the first ring while the third ring is spaced from the radially extending portion of the first ring. The fastener also includes means connectable to the second and third rings for urging the second and third rings axially toward each other whereby the second ring is urged against said opposite side of the wheel or wheel-like body so that the wheel or wheel-like body is axially pressed between the first and second faces of the respective first and second rings, and the inner cylindrical surface of the boss is radially pressed against the shaft by the action of the inner surface of the third ring against the tapered outer surface of the boss.

Other objects, features and advantages of the invention will be apparent from the following detailed description when read in conjunction with the accompanying drawings.

DETAILED DESCRIPTION

Figure 3:
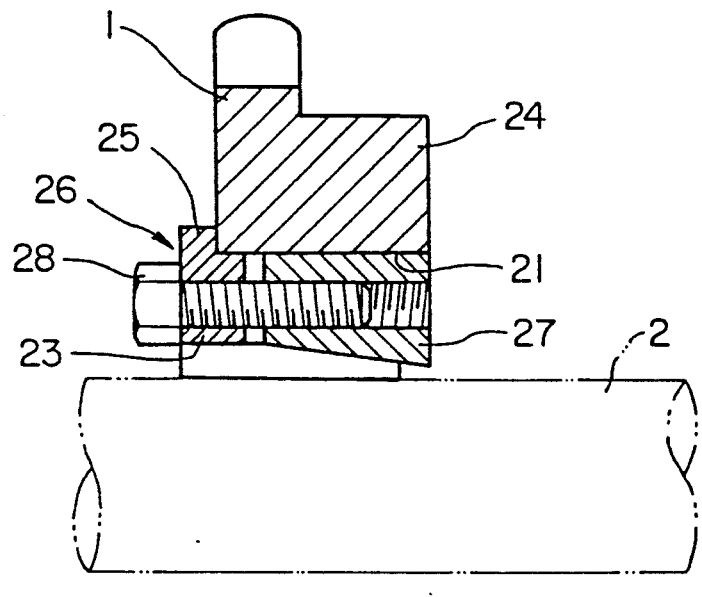
FIG. 3 is a partial axial section of a conventional fastening device in accordance with the prior art.
Figure 4:
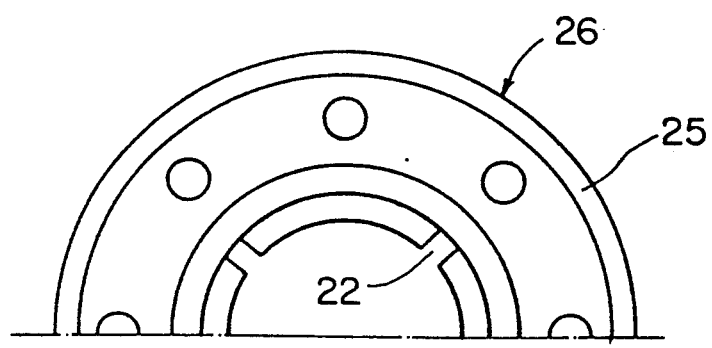
FIG. 4 is a partial elevation showing the inner ring of the fastening device of FIG. 3.

In the prior art fastening device of FIGS. 3 and 4, a wheel-like body 1, in this case a gear, is mounted on a shaft 2. The gear is provided with a boss 24, and has a cylindrical central hole 21, which is in coaxial relationship with shaft 2, but which has an inner diameter considerably larger than the outer diameter of the shaft. An inner ring 26 comprises a flange 25, which bears axially against a face of the gear, and an inner portion 23, which extends axially into the space between shaft 2 and the wall of hole 21. The inner portion fits onto the shaft, and is formed with a tapered outer surface and a plurality of slots 22 (shown in FIG. 4). An outer ring 27 has a tapered inner surface conforming with and contacting the tapered outer surface of the inner ring, and also has a cylindrical outer surface engaging the wall of hole 21. A bolt 28, threaded into outer ring 27 pulls the outer ring 27 toward flange 25 of the inner ring. The action of the cooperating tapered surfaces of the inner and outer rings causes the outer ring to be pressed radially outward against the wall of hole 21 in the gear, while the axially extending inner portion of the inner ring is pressed radially inward against shaft 2. This securely locks the gear to the shaft, but requires the gear to have a large diameter hole, and a boss having a sufficient tensile strength to withstand the large outward forces imposed on it by the cooperating tapered rings.

Figure 1:
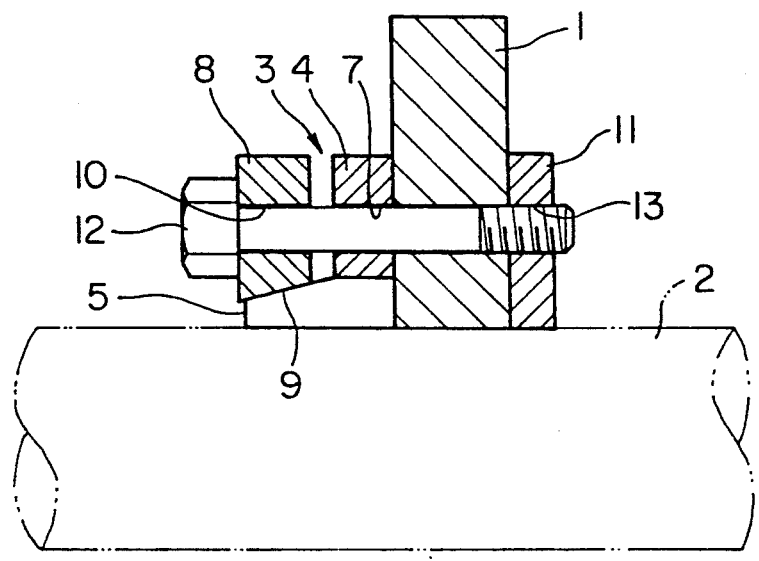
FIG. 1 is a partial axial section showing a fastening device in accordance with the invention.
Figure 2:
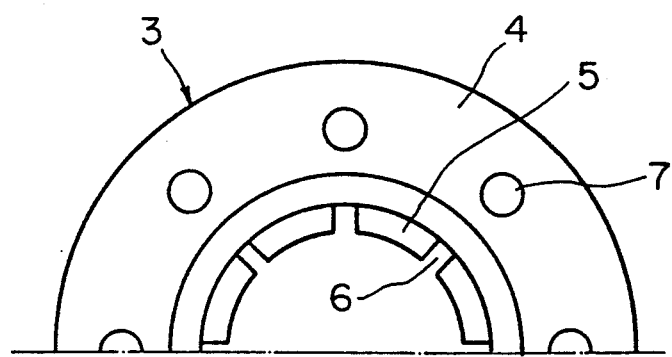
FIG. 2 is left-hand side elevation showing the shaft clamping ring.

In the assembly in accordance with the invention, as depicted in FIGS. 1 and 2, a wheel 1 is mounted on shaft 2. Here, the wheel is secured to the shaft by axial pressure applied to both sides of the wheel rather than by radial outward pressure exerted on the wall of the central hole in the wheel. Consequently, it is unnecessary to provide the wheel with a thick-walled boss, as is the case with a conventional assembly. The wheel can be made with a uniform axial thickness, as shown.

Ring 3 comprises a radially extending portion 4 having a face in contact with one of the faces of wheel 1. Ring 3 also comprises a boss 5 extending axially in a direction away from wheel 1. Ring 3 has a cylindrical inner surface which snugly fits shaft 2. The boss 5 has a uniform series of circumferentially spaced slots 6 (FIG. 2) extending axially from the end of the boss remote from radially extending portion 4. The outer surface of boss 5 is tapered down in a direction away from radially extending portion 4. That is, parts of the boss more remote from the radially extending portion have a smaller diameter than that of parts closer to the radially extending portion. Portion 4 and slotted boss 5 are machined as a unit. Axial bolt holes 7 are formed in portion 4 of ring 3, and are alignable with corresponding bolt holes formed in wheel 1.

A ring 11, which also surrounds shaft 2, engages the opposite face of wheel 1. Ring 11 has a series of threaded holes 13 alignable with the bolt holes in the wheel and in portion 4 of ring 3.

A third ring 8, has a tapered inner surface 9 engageable with, the tapered outer surface of boss 5 of ring 3. These tapered surfaces are preferably conical and conform to each other for area contact. The dimensions of surface 9 are such that it contacts the outer surface of boss 5 while ring 8 is axially spaced from portion 4 of ring 3. Ring 8 has a series of bolt holes alignable with the bolt holes in ring 3, wheel 1 and ring 11.

When bolts 12 are inserted through the bolt holes in rings 8 and 3 and wheel 1, and threaded into the threaded holes 13 ring 11, ring 8 is urged toward ring 11. The engagement of the tapered surfaces of ring 8 and boss 5 causes boss 5 to be pressed against shaft 2 so that ring 3 is securely fixed to the shaft. At the same time, the action of the bolts urges ring 11 against the adjacent face of wheel 1, causing the wheel to be axially pressed between rings 3 and 11, so that the wheel is also securely fixed to the shaft.

The fastening device can be released by loosening the bolts and moving ring 8 axially away from radially extending portion 4 of ring 3, so that slotted boss 5 is no longer pressed against the shaft. The assembly comprising the wheel, the bolts and the three rings can then be repositioned on the shaft.

No significant radial force is applied to the wheel. The forces acting on the wheel are substantially entirely axial compressive forces. The wheel, therefore, does not need to have a high tensile strength.

Torque is transmitted from the wheel to the shaft, and from the shaft to the wheel by the frictional engagement of boss 5 with the shaft, and by the frictional engagement of rings 3 and 11 with the faces of the wheel. The axial forces exerted on the wheel by rings 3 and 11 are distributed over large areas of contact. Consequently, a large amount of torque can be transmitted while the pressure exerted on the wheel at any given location on its surface is relatively small. The wheel therefore need not have a high compressive strength. Preferably, the outer diameter of ring 11 is substantially the same as the outer diameter of ring 3, so that the area of contact between ring 11 and wheel 1 is substantially the same as the area of contact between ring 3 and wheel 1.

Because the fastening device of the invention allows the use of a wheel or wheel-like body having relatively low compressive and tensile strength, the wheel can be made of various synthetic resins, non-ferrous metals or other relatively low-strength materials.

Another advantage of the fastening device is that it allows the center hole in the wheel or wheel-like body to fit the shaft closely. This makes it possible to center the wheel or wheel-like body on the shaft more accurately.

Still another advantage of the fastening device is that the outside dimensions of the wheel or wheel-like body need only be slightly larger than the outside dimensions of the rings of the fastening device. Furthermore, by selecting bolts of appropriate length, wheels and wheel-like bodies of various axial dimensions can be accommodated. Consequently the fastening device has a high degree of versatility in that the same fastening device rings can be used with wheels and wheel-like bodies having various sizes and shapes.

Various modifications can be made to the fastening device of FIGS. 1 and 2. For example, whereas bolt 12 is shown threaded into ring 11, by designing ring 8 with threaded holes and ring 11 with clearance holes, the bolts can be reversed. Many other modifications which will occur to those skilled in the art may be made without departing from the scope of the invention as defined in the following claims.

We claim:

1. A device for fastening a wheel or wheel-like body to a shaft comprising:

a shaft clamping ring having means providing a substantially cylindrical central opening capable of receiving a shaft, said shaft clamping ring including a radially extending portion having means providing a first face on one side of the radially extending portion for engaging one side of the wheel or wheel-like body in a first axial direction, and a boss extending axially from the other side of said radially extending portion, said substantially cylindrical central opening extending axially through said radially extending portion and through said boss so that said boss has a substantially cylindrical inner surface, and said boss having an outer surface tapered down in a direction opposite to said first axial direction;

means providing a surface for engaging the opposite side of the wheel or wheel-like body in an axial direction opposite to said first axial direction;

a pressing ring having an inner surface engageable with said tapered outer surface of the boss of said first ring while said pressing ring is spaced from said radially extending portion of said first ring; and means, connectable to said surface-providing means and said pressing ring, for urging said surface-providing means and said pressing ring axially toward each other; whereby said surface-providing means is urged against said opposite side of the wheel or wheel-like body so that said wheel or wheel-like body is axially pressed between said surface-providing means and said clamping ring, and the substantially cylindrical inner surface of said boss is radially pressed against the shaft by the action of said inner surface of the pressing ring against the tapered outer surface of said boss.

2. A device according to claim 1 in which said tapered outer surface of the boss is substantially conical in shape.

3. A device according to claim 1 in which said boss has a plurality of circumferentially spaced slots extending axially from the end of the boss remote from said radially extending portion.

4. A device according to claim 1 in which said tapered outer surface of the boss is substantially conical in shape and in which said inner surface of the third ring is also substantially conical in shape and substantially conforms to the tapered outer surface of the boss.

5. A device according to claim 1 in which said means connectable to said surface-providing means and said pressing ring for urging said surface-providing means and said pressing ring axially toward each other comprises a plurality of axially extending, circumferentially spaced bolts.

6. A device for fastening a wheel or wheel-like body to a shaft comprising:

a first ring having means providing a substantially cylindrical central opening capable of receiving a shaft, said first ring including a radially extending portion having means providing a first face on one side of the radially extending portion for engaging one side of the wheel or wheel-like body in a first axial direction, and a boss extending axially from the other side of said radially extending portion, said substantially cylindrical central opening extending axially through said radially extending portion and through said boss so that said boss has a substantially cylindrical inner surface, and said boss having an outer surface tapered down in a direction opposite to said first axial direction;

a second ring having means providing a second face for engaging the opposite side of the wheel or wheel-like body in an axial direction opposite to said first axial direction;

a third ring having an inner surface engageable with said tapered outer surface of the boss of said first ring while said third ring is spaced from said radially extending portion of said first ring; and means, connectable to said second and third rings for urging said second and third rings axially toward each other; whereby said second ring is urged against said opposite side of the wheel or wheel-like body so that said wheel or wheel-like body is axially pressed between said first and second faces of the respective first and second rings, and the substantially cylindrical inner surface of said boss is radially pressed against the shaft by the action of said inner surface of the third ring against the tapered outer surface of said boss.

7. A device according to claim 6 in which said tapered outer surface of the boss is substantially conical in shape.

8. A device according to claim 6 in which said boss has a plurality of circumferentially spaced slots extending axially from the end of the boss remote from said radially extending portion.

9. A device according to claim 6 in which said tapered outer surface of the boss is substantially conical in shape and in which said inner surface of the third ring is also substantially conical in shape and substantially conforms to the tapered outer surface of the boss.

10. A device according to claim 6 in which said means connectable to said second and third rings for urging said second and third rings axially toward each other comprises a plurality of axially extending, circumferentially spaced bolts.

11. A device according to claim 6 in which said means connectable to said second and third rings for urging said second and third rings axially toward each other comprises a plurality of axially extending, circumferentially spaced bolts, in which said radially extending portion of said first ring has a plurality of circumferentially spaced through holes, and in which said bolts extend through said through holes.

12. A device according to claim 6 in which the second ring has a plurality of circumferentially spaced threaded holes, and said means connectable to said second and third rings for urging said second and third rings axially toward each other comprises a plurality of axially extending, circumferentially spaced bolts threadable into said threaded holes of the second ring.

13. An assembly of a shaft and a body mounted thereon comprising:

a shaft;

a body mounted on said shaft;

a first ring having means providing a substantially cylindrical central opening receiving and snugly fitting said shaft, said first ring including a radially extending portion having means providing a first face on one side of the radially extending portion, said first face engaging one side of said body in a first axial direction, and a boss extending axially from the other side of said radially extending portion, said substantially cylindrical central opening extending axially through said radially extending portion and through said boss so that said boss has a substantially cylindrical inner surface, and said boss having an outer surface tapered down in a direction opposite to said first axial direction;

a second ring having means providing a second face engaging the opposite side of said body in an axial direction opposite to said first axial direction;

a third ring having an inner surface engageable with said tapered outer surface of the boss of said first ring while said third ring is spaced from said radially extending portion of said first ring; and means connectable to said second and third rings for urging said second and third rings axially toward each other; whereby said second ring is urged against said opposite side of said body so that said body is axially pressed between said first and second faces of the respective first and second rings, and the substantially cylindrical inner surface of said boss is radially pressed against the shaft by the action of said inner surface of the third ring against the tapered outer surface of said boss.

14. An assembly according to claim 13 in which said tapered outer surface of the boss is substantially conical in shape.

15. A device according to claim 13 in which said boss has a plurality of circumferentially spaced slots extending axially from the end of the boss remote from said radially extending portion.

16. A device according to claim 13 in which said tapered outer surface of the boss is substantially conical in shape and in which said inner surface of the third ring is also substantially conical in shape and substantially conforms to the tapered outer surface of the boss.

17. A device according to claim 13 in which said means connectable to said second and third rings for urging said second and third rings axially toward each other comprises a plurality of axially extending, circumferentially spaced bolts.

18. A device according to claim 13 in which said means connectable to said second and third rings for urging said second and third rings axially toward each other comprises a plurality of axially extending, circumferentially spaced bolts, in which said radially extending portion of said first ring has a plurality of circumferentially spaced through holes, and in which said bolts extend through said through holes.

19. A device according to claim 13 in which the second ring has a plurality of circumferentially spaced threaded holes, and said means connectable to said second and third rings for urging said second and third rings axially toward each other comprises a plurality of axially extending, circumferentially spaced bolts threadable into said threaded holes of the second ring.

20. A device according to claim 13 in which said means connectable to said second and third rings for urging said second and third rings axially toward each other comprises a plurality of axially extending, circumferentially spaced bolts, in which said body has a plurality of circumferentially spaced through holes, and in which said bolts extend through said through holes in said body.

* * * * *